United States Patent [19]

Tomlinson

[11] 4,270,419
[45] Jun. 2, 1981

[54] MULTI-SPINDLE LATHES
[75] Inventor: Geoffrey E. S. Tomlinson, Solihull, England
[73] Assignee: White-BSA Tools Ltd., Birmingham, England
[21] Appl. No.: 41,485
[22] Filed: May 22, 1979
[30] Foreign Application Priority Data
  May 24, 1978 [GB] United Kingdom ............... 53-22139
[51] Int. Cl.³ .......................... B23B 3/34; B23B 21/00
[52] U.S. Cl. ................................................ 82/3; 82/25
[58] Field of Search .................. 82/3, 24, 25, 28 R, 82/28 A, 29 R, 29 B

[56] References Cited
U.S. PATENT DOCUMENTS

| | | | |
|---|---|---|---|
| 3,798,720 | 3/1974 | Lederoerber et al. | 82/3 |
| 4,008,634 | 2/1977 | Flisch | 82/3 |

FOREIGN PATENT DOCUMENTS 2544098  5/1976  Fed. Rep. of Germany ............... 82/3

Primary Examiner—Harrison L. Hinson

[57] ABSTRACT

A multi-spindle machine tool has a frame mounting a workpiece holder which carries a plurality of rotatable spindles, a tool slide mounted on the frame for movement towards and away from the workpiece holder and adapted to mount at least one tool when in use, and a drive for the tool. The drive includes a main drive shaft, a mounting block on the frame having a plurality of mounting surfaces parallel to and disposed around the main drive shaft, and a respective auxiliary drive shaft for the tool. The auxiliary drive shaft is driven by the main drive shaft and rotatably supported by a respective block which is removably secured to a respective one of said mounting surfaces.

12 Claims, 5 Drawing Figures

MULTI-SPINDLE LATHES

This invention relates to a multi-spindle machine tool and has as its object to provide such a machine tool in a convenient form.

According to the present invention, there is provided a multi-spindle machine tool comprising a frame, workpiece holding means mounted on the frame and including a plurality of rotatable spindles, a tool slide mounted on the frame for movement towards and away from the workpiece holding means and adapted to have at least one tool mounted thereon in use, and a drive for said at least one tool, the drive comprising a main drive shaft, a mounting block on the frame having a plurality of mounting surfaces parallel to and disposed around the main drive shaft, and a respective auxiliary drive shaft for the or each tool, the or each auxiliary drive shaft being driven by the main drive shaft and being rotatably supported by a respective block which is removably secured to a respective one of said mounting surfaces.

Embodiments of the present invention will now be described, by way of example, with reference to the accompanying drawings, in which.

Figure 1:
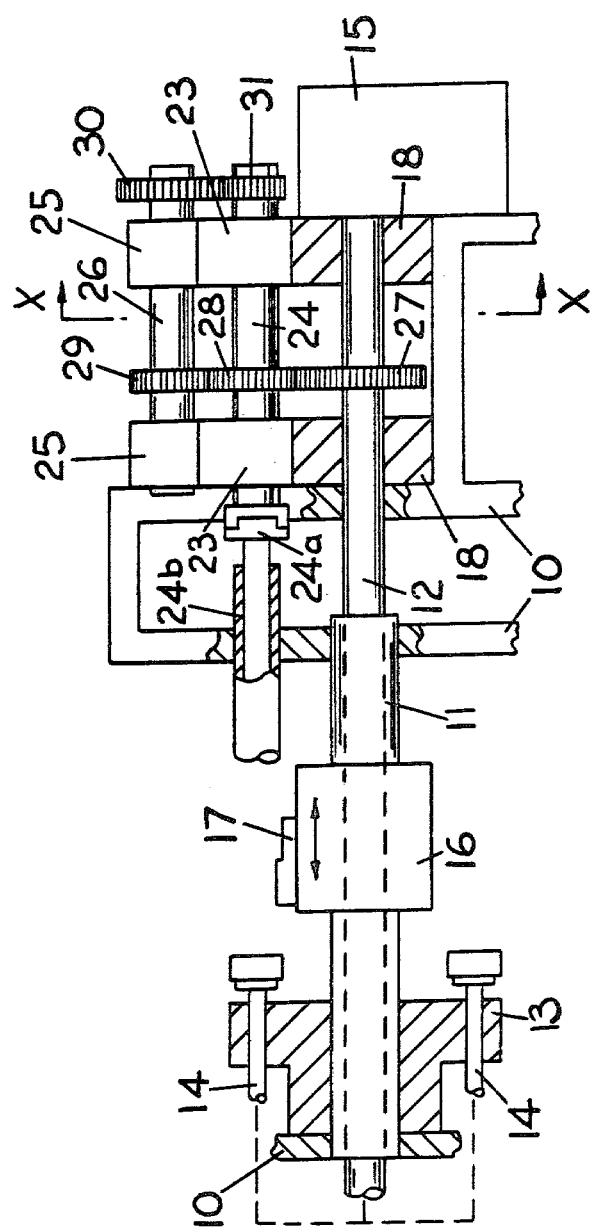
FIG. 1 is a schematic side view, partly in section, of a machine tool according to the present invention, in the form of a multi-spindle lathe.

Referring first to FIG. 1, the multi-spindle lathe comprises a frame 10 (only parts of which are shown) having a tubular support 11 thereon, a main drive shaft 12 being rotatably mounted within the support 11. A spindle carrier 13 is mounted on the support 11 for indexing movement about the axis of the shaft 12, and carries a plurality of work spindles 14 which are arranged in parallel equi-angularly spaced relation about the axis of the carrier. The spindles 14 are rotated in use by the main drive shaft 12, by connection thereto (shown in dotted lines) preferably in the manner disclosed in our corresponding U.S. Application Ser. No. 41,518 filed simultaneously herewith. A gear box 15 for the main drive shaft 12 is mounted on the frame 10.

A tool slide 16 is mounted on the tubular support 11 for sliding movement towards and away from the carrier 13, the tool slide preferably being of the type disclosed in our corresponding U.S. Application Ser. No. 41,482 filed simultaneously herewith. Tool holders, such as that shown at 17, can be secured to the tool slide 16 or can be mounted thereon for movement towards and away from the carrier 13 independently of the tool slide, and an auxiliary tool drive is provided for each of these tool holders, examples of the auxiliary tool drive being shown in FIGS. 2 to 5.

Figure 2:
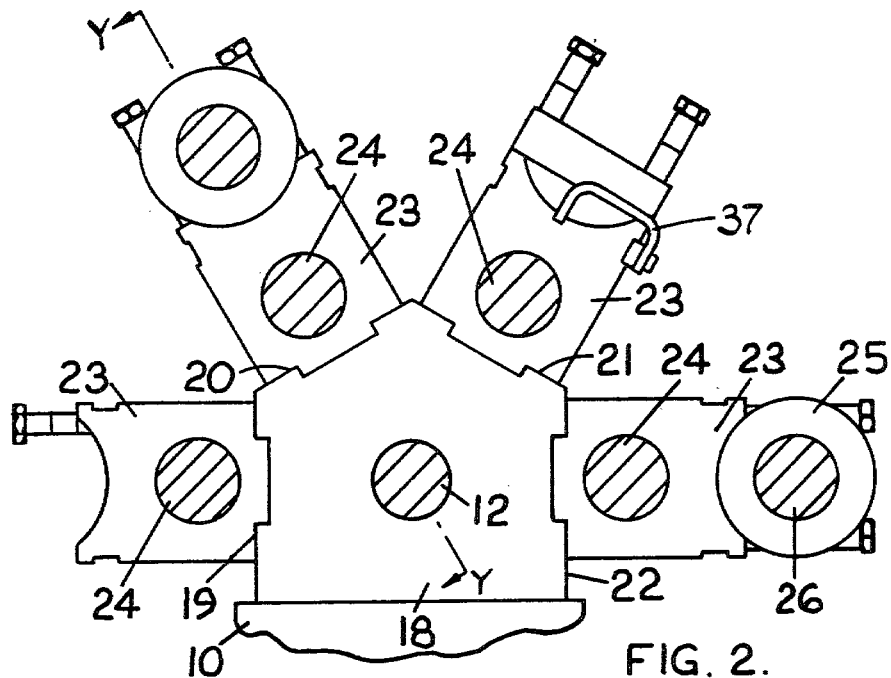
FIG. 2 is a section taken along the line X—X in FIG. 1, with parts of the machine tool removed for clarity.
Figure 3:
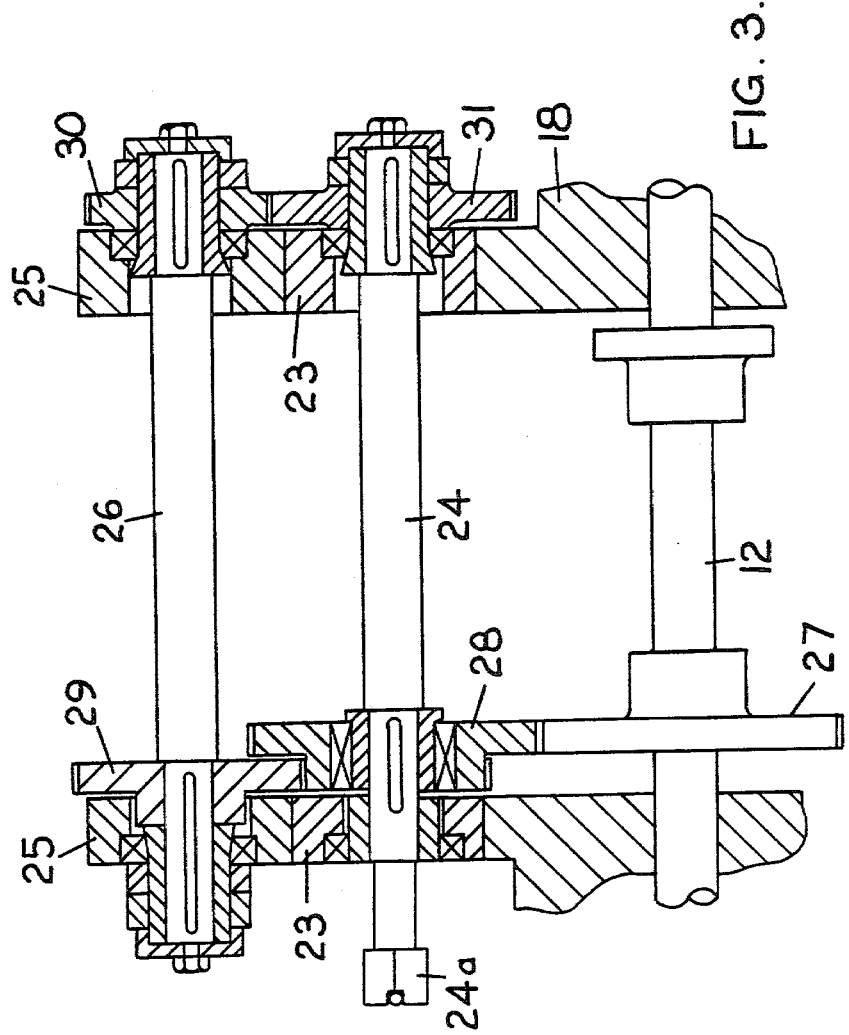
FIG. 3 is a section taken along line Y—Y in FIG. 2.

Referring now also to FIGS. 2 and 3, a pair of mounting blocks 18 are mounted on the frame 10 in spaced apart relation along the axis of the drive shaft 12, the shaft 12 rotatably extending through each of the blocks. Only one of the blocks 18 is shown in FIG. 2, the other block being generally identical thereto. Each block 18 has four generally planar, outwardly facing mounting surfaces 19, 20, 21 and 22 which are parallel to the axis of the drive shaft 12 and which are equi-spaced therefrom. The angle between each adjacent pair of mounting surfaces is the same, the surfaces 19 and 22 being parallel to one another.

Four auxiliary mounting blocks 23 are bolted to the mounting surfaces 19, 20, 21 and 22 respectively of each mounting block 18, a respective auxiliary drive shaft 24 being rotatably supported by and extending between each corresponding pair of auxiliary mounting blocks on the two main mounting blocks 18, such that the shafts 24 are parallel to and equi-spaced from the main drive shaft 12. The auxiliary drive shafts 24 are driven in a manner to be described by the main drive shaft 12, and are each coupled to a tool (not shown) on a respective one of the tool holders 17 by means of a respective coupling member 24a and a respective sliding connection 24b which allows for movement of the tool slide 16 towards and away from the carrier 13. Some of the auxiliary mounting blocks 23 have bearing blocks 25 bolted thereto which rotatably support respective lay shafts 26.

A common gear 27 is mounted on the main drive shaft 12 for rotation therewith, and is meshed with a respective gear 28 on each of the auxiliary drive shafts 24. Where the auxiliary drive shaft has no associated lay shaft, the gear 28 is secured to the auxiliary drive shaft for rotation therewith. Where there is an associated lay shaft (as illustrated in FIGS. 1 and 3), the gear 28 is rotatable relative to its auxiliary drive shaft and acts merely as an idler to transmit the drive at any desired gear ratio from the main drive shaft 12 to a gear 29 on the associated lay shaft. In the latter case, an additional pair of gears 30 and 31 serve to transmit the drive from the lay shaft 26 to the respective auxiliary drive shaft 24 again at any desired gear ratio, and are mounted on adjacent ends of the lay shaft and auxiliary drive shaft, respectively, outboard of the respective blocks 23 and 25. In this way, the pair of gears 30 and 31 are readily accessible for interchange or replacement by a further pair of gears having a different gear ratio.

Figure 4:
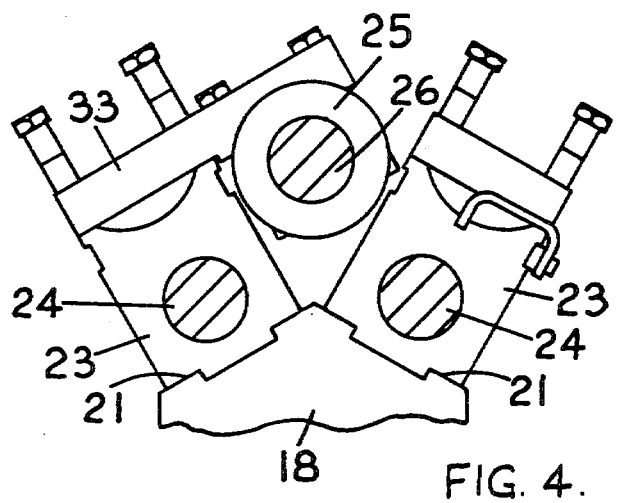
FIG. 4 is a similar view to FIG. 2 showing a modified form of machine tool.

If desired, two adjacent auxiliary drive shafts can be driven by way of a common lay shaft. Such an arrangement is illustrated in FIG. 4, in which a bearing block 25 instead of being bolted directly to an auxiliary mounting block 23 is bolted to a support member 33 secured to the block 23, and the lay shaft 26 is disposed for operative engagement with both of the adjacent auxiliary drive shafts 24.

Figure 5:
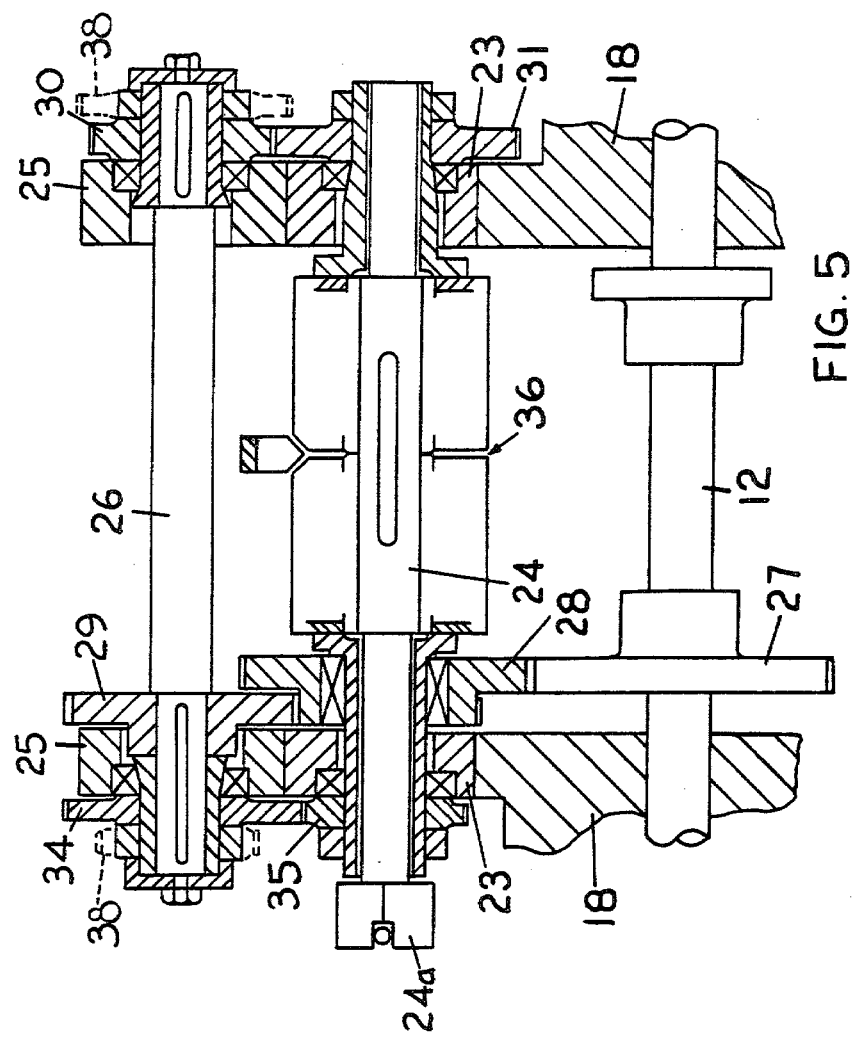
FIG. 5 is a similar view to FIG. 3 showing a further modified form of machine tool.

FIG. 5 illustrates an alternative arrangement for transmitting the drive to those auxiliary drive shafts which are provided with associated lay shafts. In this arrangement, an additional pair of gears 34 and 35 are provided for transmitting the drive from the lay shaft 26 to the auxiliary drive shaft 24, these gears being mounted on ends of the lay shaft and auxiliary drive shaft remote from the gears 30 and 31. The pair of gears 34 and 35 have a different gear ratio from that of the pair of gears 30 and 31, and a clutch 36 (shown schematically) is provided to place the auxiliary drive shaft in driving engagement with one or the other of the pair of gears. A U-shaped member 37 is provided on one of the blocks 23 (see FIG. 5) to hold a stationary field winding of the clutch 36 against rotation with the shaft 24. In this way, the speed of the auxiliary drive shaft as compared with that of the main drive shaft 12 can be changed merely by actuating the clutch 36 and without the necessity of replacing the pair of gears 30 and 31.

Where a single lay shaft is provided for two adjacent auxiliary drive shafts, the lay shaft can be provided with additional gears 38 (shown in broken lines) for driving the additional auxiliary drive shaft, whereby the hand of the drive and the speed of rotation of the two auxiliary drive shafts can be made independent of each other.

In all of the above-described arrangements, the auxiliary mounting blocks 23 together with any bearing blocks 25 and lay shafts 26 can be assembled off the machine and bolted onto the blocks 18 as a complete assembly when it is desired to change the tooling of the lathe. The time taken to set up the lathe for use can thus be reduced significantly.

I claim:

1. A multi-spindle machine tool comprising a frame, a main drive shaft rotatably mounted on said frame, workpiece holding means mounted on said frame and including a plurality of rotatable work spindles, a tool slide mounted on said frame for movement towards and away from said workpiece holding means and adapted to have at least one tool mounted thereon, a main mounting block fixed to said frame, a plurality of mounting surfaces on said main mounting block parallel to and disposed around said main drive shaft, at least one auxiliary mounting block each of which is removably secured to a respective one of said mounting surfaces, at least one auxiliary drive shaft rotatably supported by said at least one auxiliary mounting block for detachable drive-transmitting engagement with said at least one tool, and transmission means for transmitting drive from said main drive shaft to each said auxiliary drive shaft, said transmission means including a first part coupled to said main drive shaft and a second part coupled to each said auxiliary drive shaft, said first and second parts being detachably engaged, whereby each said auxiliary mounting block and the respective auxiliary drive shaft and second part of said transmission means can be removed as a unit from said main mounting block.

2. A machine tool as claimed in claim 1, wherein the first part of the transmission means is a common gear rotatable with the main drive shaft and the second part of the transmission is a further gear rotatable with the auxiliary shaft and meshing with said common gear.

3. A machine tool as claimed in claim 2, including one or more lay shafts through the intermediary of which the drive is transmitted from the main drive shaft to selected ones of the auxiliary drive shafts.

4. A machine tool as claimed in claim 3, including two auxiliary drive shafts which are driven through the intermediary of a common lay shaft.

5. A machine tool as claimed in claim 4, including an idler gear on the auxiliary drive shaft with which said lay shaft is associated for transmitting drive from the main drive shaft to selected ones of said lay shafts.

6. A machine tool as claimed in claim 3, 4 or 5, wherein said transmission means includes a pair of gears removably mounted on the ends of the lay shaft and auxiliary drive shaft, respectively, such that the pair of gears is readily accessible for changing.

7. A machine tool as claimed in claim 6, including a further pair of gears are mounted respectively on selected ones of said lay shafts and associated auxiliary drive shaft, the further pair of gears having a different gear ratio from the first-mentioned pair of gears, and a clutch operable to place selected ones of the pairs of gears in driving engagement with the auxiliary drive shaft.

8. A machine tool as claimed in claim 6 wherein selected ones of said lay shafts are rotatably supported by a bearing block which is removably secured to the block which supports a selected one of the associated auxiliary drive shaft.

9. A machine tool as claimed in claim 1 wherein the mounting surfaces of the block are disposed symmetrically around the main drive shaft.

10. A machine as claimed in claim 1 wherein the drive includes two mounting blocks which are spaced apart axially of the main drive shaft.

11. A machine tool as claimed in, claim 1 wherein the main drive shaft also drives said plurality of work spindles.

12. A machine tool as claimed in, claim 1 wherein said workpiece holding means comprises a spindle carrier is mounted on the frame for indexing movement relative thereto and a plurality of work spindles rotatable carried on said carrier.

* * * * *